United States Patent [19]

Matsumura et al.

[11] Patent Number: 4,558,428
[45] Date of Patent: Dec. 10, 1985

[54] DATA TRANSMISSION SYSTEM ADAPTED TO FACILITATE DETECTION OF SAFE RECEIPT OF A TRANSMITTED DATA FRAME BY A RECEIVING STATION

[75] Inventors: Hisashi Matsumura, Hadano; Toyokazu Hashimoto, Kanagawa; Masahiko Kida; Hiroyuki Wada, both of Hadano, all of Japan

[73] Assignee: Hitachi, Ltd., Tokyo, Japan

[21] Appl. No.: 344,977

[22] Filed: Feb. 2, 1982

[30] Foreign Application Priority Data

Feb. 3, 1981 [JP] Japan .................................. 56-14571

[51] Int. Cl.⁴ ........................ G06F 11/08; G06F 11/16
[52] U.S. Cl. ..................................... 364/900; 370/86; 371/71
[58] Field of Search .................. 364/200, 900; 370/86, 370/92; 371/71, 68, 67

[56] References Cited

U.S. PATENT DOCUMENTS

| | | | |
|---|---|---|---|
| 3,919,484 | 11/1975 | Mayemchuk | 370/86 |
| 4,078,228 | 3/1978 | Miyazaki | 370/86 |
| 4,136,384 | 1/1979 | Okada et al. | 370/86 |
| 4,225,753 | 9/1980 | Chown et al. | 370/86 |
| 4,304,001 | 12/1981 | Cope | 371/68 |
| 4,335,426 | 6/1982 | Maxwell et al. | 364/200 |
| 4,410,985 | 10/1983 | Yasumoto et al. | 370/86 |
| 4,447,903 | 5/1984 | Sewerinson | 371/68 |

FOREIGN PATENT DOCUMENTS 0112156 9/1981 Japan ..................................... 370/86

Primary Examiner—Raulfe B. Zache
Assistant Examiner—W. G. Niessen
Attorney, Agent, or Firm—Antonelli, Terry & Wands

[57] ABSTRACT

This invention relates to a loop transmission system which has a plurality of stations connected to a loop transmission path to transmit data among the stations. In the transmission frame to be sent out from the sending station, specific information is included for identifying each frame and this information is held in the sending station. When the transmission frame returns to the sending station after being transmitted through the loop transmission path, the specific information in the frame is received and compared with the information held in the station and, if they coincide, it is decided that the transmission frame has been correctly received by the intended receiving station.

6 Claims, 5 Drawing Figures

| ITEM | LA PATTERN | CONTENTS OF RESPONSE |
|---|---|---|
| 1 | 00010010 | THE FRAME HAS NOT BEEN RECEIVED DUE TO CRC ERROR OR R-ST DOWN. |
| 2 | 00100100 | THE FRAME HAS NOT BEEN RECEIVED BECAUSE THE BUFFER AT R-ST IS FULLY OCCUPIED. |
| 3 | 01001000 | THE FRAME HAS BEEN RECEIVED NORMALLY. |

FIG. 1
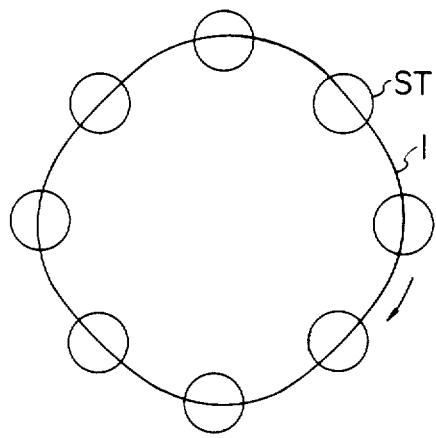
FIG. 2
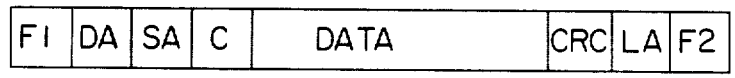
FIG. 3
| ITEM | LA PATTERN | CONTENTS OF RESPONSE |
|---|---|---|
| 1 | 00010010 | THE FRAME HAS NOT BEEN RECEIVED DUE TO CRC ERROR OR R-ST DOWN. |
| 2 | 00100100 | THE FRAME HAS NOT BEEN RECEIVED BECAUSE THE BUFFER AT R-ST IS FULLY OCCUPIED. |
| 3 | 01001000 | THE FRAME HAS BEEN RECEIVED NORMALLY. |

DATA TRANSMISSION SYSTEM ADAPTED TO FACILITATE DETECTION OF SAFE RECEIPT OF A TRANSMITTED DATA FRAME BY A RECEIVING STATION

BACKGROUND OF THE INVENTION

This invention relates to a loop transmission system (which may be referred to as a data highway) having a loop transmission path and a plurality of stations (node processors) connected to the loop to carry out data transmission among the stations, and more particularly, to a loop transmission system which can easily confirm whether a transmission frame sent out from a sending station has been correctly received by a receiving station in the data transmission between the stations.

Conventionally, in order to confirm at the sending station (referred to as S-ST hereinafter) that a transmission frame sent out from the S-ST has been correctly received by the receiving station (referred to as R-ST hereinafter) it has been proposed to generate a response frame at the R-ST side to show whether the frame has been correctly received or not and to send this response frame out to the S-ST side so that the S-ST side can confirm, upon receiving this response frame, whether or not the transmission frame has been received by the R-ST.

This conventional system, however, has the following drawbacks.

(1) The R-ST side is burdened with considerable work for preparing a response frame, which may reduce the processing capacity of the R-ST side.

(2) Since respective response frames sent out from the R-ST's are usually not in the order received by the S-ST side (i.e. the response frames are not necessarily received in the order in which the corresponding transmission frames have been sent out from the S-ST's), the confirmation processing of the response frames at the S-ST side becomes complex.

SUMMARY OF THE INVENTION

It is therefore an object of this invention to provide a system which reduces the work of the R-ST side for preparing such response frames, enables the S-ST to make the confirmation within a predetermined time period with respect to each of the transmission frames and also in the same order as that in sending the frames by the S-ST side, thereby reducing the work of the S-ST and R-ST sides required for making the confirmation and reducing the capacity of the buffer for sending data.

According to this invention, each transmission frame is provided with a specific information area for individually identifying the frames to be sent out from the same S-ST so that it is possible for each S-ST to decide whether each transmission frame sent out from the S-ST has been correctly received by the R-ST side by checking the above-mentioned area when the transmission frame has returned to the S-ST after circulating through the loop transmission path.

BRIEF DESCRIPTION OF THE DRAWINGS

FIG. 1 is a schematic diagram of the loop transmission system to which this invention is applied.

FIG. 2 is a diagram showing the format of the transmission frame employed in the present invention.

FIG. 3 is a table showing the contents of the LA field.

DESCRIPTION OF THE PREFERRED EMBODIMENTS

Figure 4:
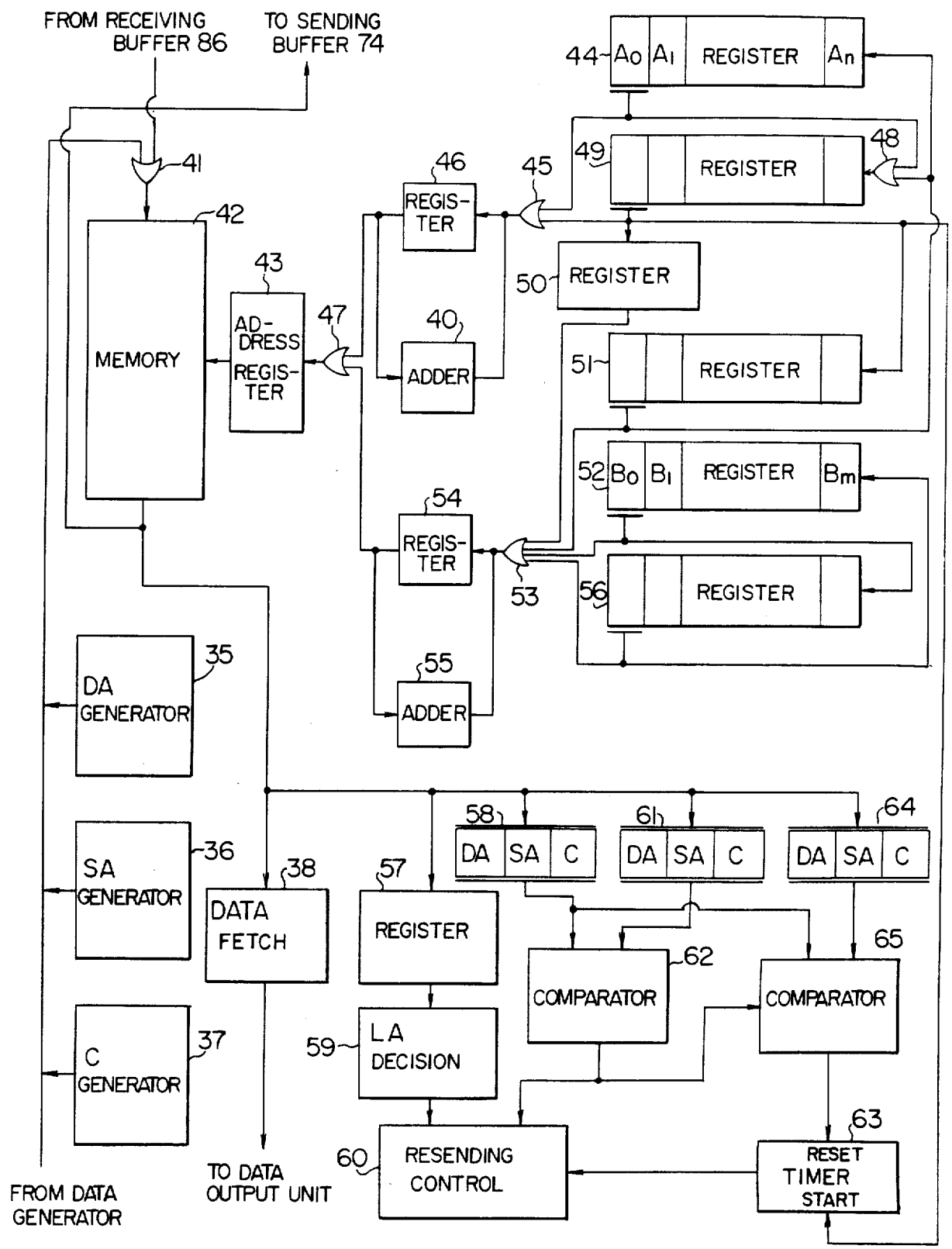
FIGS. 4 and 5 are block diagrams of the station arranged according to the present invention.

FIG. 1 shows a schematic view of the type of loop transmission system to which this invention is directed. Referring to FIG. 1, stations (ST) are connected through a loop transmission path 1 and the data sent out from any ST passes through the path in the direction of the arrow via other stations to return to the original ST.

FIG. 2 shows the format of a transmission frame sent out on the loop according to this invention. This format is similar to that of the transmission frame used in the high level data link control procedure (HDLC), and is composed, in that order, of a one-byte flag ($F_1$) to indicate the start of the frame, followed by a one-byte field (DA) to indicate the address of the R-ST by which this frame is to be received, a one-byte field (SA) for indicating the address of the S-ST from which this frame is sent out, a one-byte sequence field (C) providing a data sequence number, a data field (DATA) carrying transmission information, a two-byte field (CRC) providing a CRC code which is used for CRC check to detect errors, such as bit errors, in the contents of responsive fields from the DA field to the DATA field described above, a one-byte loop answer field (LA) to provide a return response from the R-ST side, and a one-byte flag ($F_2$) representing the end of the frame. The length of the DATA field may be different depending on the contents of information to be sent by the transmission frame. The flags $F_1$ and $F_2$ have the same patterns.

The provision of the C field is one of the features of the present invention. The C field is used to individually indentify each of the data frames sent out from the same S-ST, and is provided with a serial number allotted to each frame in the sequence of the frames to be sent, independently of the ST's which receive the frames.

FIG. 3 shows the content of the LA field. An example of the use of the LA field will be explained below.

It is assumed that, in FIG. 1, the transmission frame shown in FIG. 2 is sent from the S-ST and it is received by the R-ST side. In sending the frame from the S-ST, the LA field carries a pattern $(12)_{16}$ as shown in Item 1 in FIG. 3. Depending on the conditions occurred when this frame has arrived at the R-ST side, the R-ST rewrites the LA field, for example, as follows, 1. When the R-ST has received the transmission frame correctly, it rewrites the LA field to a pattern of $(48)_{16}$ as shown in Item 3.
2. When the R-ST has not received the transmission frame correctly because of occurrence of a CRC error or an R-ST fault, the LA field is kept unchanged.
3. When the receiving buffer at the R-ST side is fully occupied so that it cannot receive the transmission frame, the R-ST rewrites the LA field to a pattern of $(24)_{16}$ as shown in Item 2.

When this frame returns to the original S-ST side through the loop path, the S-ST checks the SA field of the return frame, and, if it coincides with its own station address, decides that this frame has been originated from itself and reads the LA field. By checking the content of this LA field, the S-ST can detect whether or not the frame has been received correctly by the R-ST side. If it detects the receiving buffer at the R-ST side is fully occupied and therefore the frame cannot be received, it arranges to retransmit the frame, after a short period of time. If it detects that the frame has not been received because of a CRC error or the like, it arranges to repeat retrials for sending by a predetermined number of times, and if the frame cannot be received even after these retrials, this situation is communicated to an operator, while separating the R-ST from the system.

In general, the LA field may be placed at any position of the transmission frame. However, since the LA field is prepared after the R-ST side has received the frame, it is preferable that the LA field is positioned after the frame (but before the flag $F_2$ which shows the end of the frame).

In a typical transmission system, when there appear six or more "1" bits in series on the transmission path, a "0" bit is forcibly inserted at the sixth position for discriminating between the flag pattern (01111110) and the general data. Therefore, if the pattern of the LA field were determined optionally, insertion of "0" might be required depending on the relationship between the bit patterns before and after the LA field. Thus, the necessity for the insertion of "0" may be avoided by arranging the LA pattern such that the first and last bits of the LA field are always "0" and at least one of the intermediate six bits is also "0".

Figure 5:
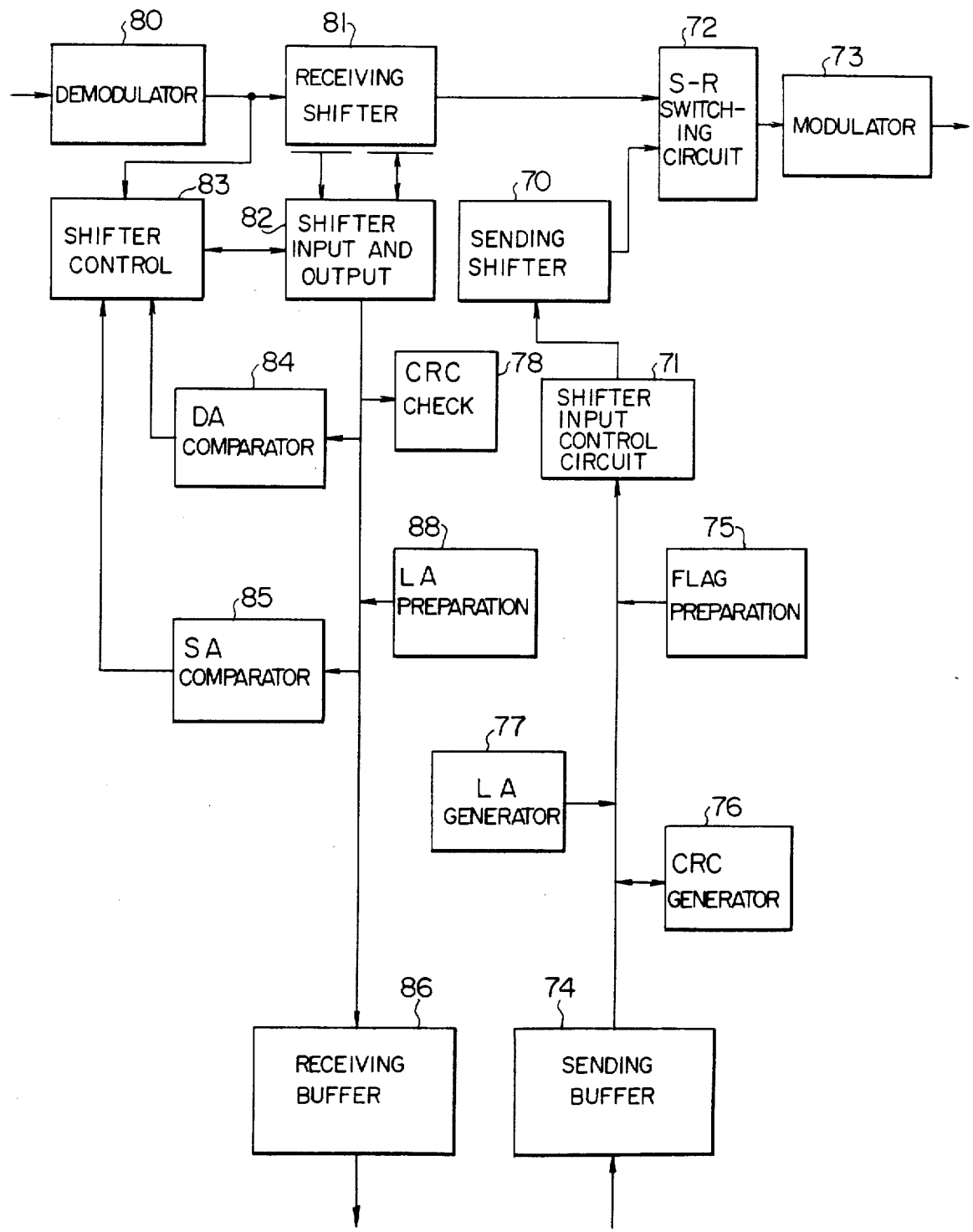

FIG. 4 and FIG. 5 are block diagrams showing the main parts of the station according to this invention. FIG. 4 shows a memory control section for exchanging data with a data generator (not shown) and FIG. 5 shows a sending and receiving control section for sending and receiving data to and from the loop transmission path. The operations of FIG. 4 and FIG. 5 will be explained below.

The operation of the S-ST will be explained first. Referring to FIG. 4, the data generated by the data generator and the outputs from a DA generator circuit 35, an SA generator circuit 36 and a C generator circuit 37 are written into a memory 42 through an OR gate 41, as DATA, DA, SA and C fields of the data frame, respectively. In this case, the DA generator circuit 35 generates a DA field which shows the address of the ST which is to receive the frame, the SA generator circuit 36 generates a SA field which shows the address of this ST and the C generator circuit 37 generates a C field which shows a serial number for each frame independently of which station should receive the frame.

The memory 42 has addressed locations each of one byte unit as well known. The writing addresses are given by the address register 43 in the following manner.

A plurality of sending areas are provided in the memory 42 as areas for writing sending data derived from the data generator, and the address data A0, A1, . . . and An which identifies the heading location of each area is set in a register 44. The register 44 is arranged to receive each data input at a left-most one of the unoccupied locations and functions as a shift register to shift the contents of respective locations to the left by one position and output the data at the first (i.e. the left end) location. The output from the register 44 is set into a register 46 through on OR gate 45. The content of the register 46 is applied to the address register 43 through an OR gate 47. The content of the register 46 is incremented by +1 by an adder 40 each time one-byte of data is written into the memory 42. The writing address of the sending data is prepared in the manner as described above.

Upon termination of the writing into the area of the memory at the address shown, the address data from the register 44 is input to a register 49 through an OR gate 48. The register 49 is of the same type as the register 44. Accordingly, each time the sending data from the data generator is writen into a given sending area of the memory 42, the heading address of this area is stored in the register 49.

There exists only one information signal designating sending right circulating at a time on the loop transmission path. A station which is ready for sending a transmission frame gets the sending right to send out the transmission frame to the transmission path, when the station receives the information signal designating sending right. Then, the data written into the memory 42 is read out, and inputted to a sending buffer 71 shown in FIG. 5. The reading address in this case is given from the address register 43. The address data for this register 43 is prepared by applying to the register the output of the register 49 through the OR gate 45, the register 46 and the OR gate 47 and by adding "1" to its content by the adder 40 each time one type of data is read out of the memory 42.

Upon termination of the reading within the sending area shown, the address data from the register 49 is inputted to a register 51 as well as to a register 50. The register 51 is of the same type as that of the register 44 or 49. Accordingly, each time the sending data is read out of any sending area of the memory 42, the heading address of that sending area is stored in the register 51. The heading address of the sending area whose data has been sent last is set in the register 50.

Now, explanation will be made, with reference to FIG. 5 of how the sending data stored in the sending buffer 74 is to be sent to the loop transmission path. In FIG. 5, a sending shifter 70 has a one-byte length which receives the bits constituting one byte of data simultaneously and shifts the bit by one bit space to output the bits one by one. Therefore, this shift register has a parallel-to-serial conversion function. A shifter input control circuit 71 controls the input of given sending data to the sending shifter 70. Numeral 72 designates a sending and receiving switching circuit which allows the output from the sending shifter 70 to pass therethrough only during the time period when the station is designated as a sending station and allows the output from a receiving shifter 81 to pass therethrough during the remaining periods. The output from the sending and receiving switching circuit 72 is sent out through a modulation circuit 73 to the loop transmission path 1. The explanation of the modulation system of the modulation circuit 73 will be unnecessary because this circuit is of any well known type and not essential for this invention.

Before a sending buffer 74 is read out, a flag $F_1$ is prepared by a flag preparation circuit 75, and applied to the sending shifter 70 through the shifter input control circuit 71. The content of the sending shifter 70 is sent to the lock transmission path 1 one by one bit through the sending and receiving switching circuit 72 and the modulation circuit 73. Thereafter, the DA, SA, C and DATA fields are read out of the sending buffer 74, and they are sent to the loop transmission path 1 through the shifter input control circuit 71, the sending shifter 70, the sending and receiving switching circuit 72 and the modulation circuit 73. Further, a CRC generator circuit 76 fetches the DA, SA, C and DATA fields applied to the shifter input control circuit 71 and prepares a CRC code. This CRC code is sent to the loop transmission path 1 following the DATA field, while the LA generator circuit 77 generates an LA field, which is sent to the loop transmission path 1 following the CRC code and the flag preparation circuit 75 prepares a flag $F_2$ which is sent to the loop transmission path 1 following the LA field. Thus, the data frame is sent in the format as shown in FIG. 2 to the loop transmission path 1. Upon terminating the sending of the transmission frame, the S-ST sends out the information signal designating the sending right to the loop transmission path 1 through a suitable circuit (not shown) so as to transfer the sending right to another station.

The operation of the R-ST will be explained below. How the data frame sent out to the loop transmission path is received will be explained with reference to FIG. 5.

In FIG. 5, the data frame from the loop transmission path 1 is inputted to a receiving shifter 81 through a demodulation circuit 80. The demodulation circuit 80 is arranged according to a demodulation system corresponding to the modulation system of the modulation circuit 73. The receiving shifter 81 has a two-byte length in which data bits are inputted to the left in series one by one and the bits of an output are produced from the right in series one by one. The receiving shifter 81 also has a serial-to-parallel conversion function to output in parallel the bits of one byte location on the left or right side and to input one byte into the right one byte location. Numeral 82 designates a shifter input and output circuit for inputting to and outputting from each of the left and right one byte locations of the receiving shifter 81, and 83 designates a shifter control circuit for controlling the operation of the shifter input and output circuit 82 as detecting the number of bits applied to the receiving shifter 81 and the status of flag $F_1$ or $F_2$ in the receiving shifter 81.

Each field of the data frame is sequentially fed to the receiving shifter 81 through the demodulation circuit 80. The shift control circuit 83 at first fetches the first one byte and upon detection of the flag $F_1$, causes the next two bytes, i.e. the DA and SA fields to be fetched into the shifter input and output circuit 82. These fields are applied to a DA comparator circuit 84 and and SA comparator circuit 85, respectively, and written to the receiving buffer 86 at the same time.

The DA comparator circuit 84 checks whether the applied DA field coincides with the own DA field or not and the SA comparator circuit 85 checks whether the applied SA field coincides with the own SA field or not. The results are reported to the shifter control circuit 83. If both the fields checked in the comparator circuits 84 and 85 do not coincide, it is decided that the data frame is not relevant to this station and the shifter control circuit 83 causes the shifter input and output circuit 82 to stop fetching of the remaining fields. Accordingly, in that case, the data frame received in the receiving shifter 81 is again fed to the loop transmission path 1 through the sending and receiving switching circuit 72 and the modulation circuit 73. The DA and SA fields stored in the receiving buffer 86 are cancelled.

The station is decided as R-ST to receive this data frame, when the field of the DA comparator circuit 84 coincides with the DA field of that station. In this case, the shifter control circuit 83 controls the shifter input and output circuit 82 to read out the C, DATA, CRC and LA fields received in the receiving shifter 81 and to write them into the receiving buffer 86. Thus, the DA, SA, C, DATA, CRC and LA fields in the data frame are written in the receiving buffer 86. The receiving buffer 86 includes a memory having addressed locations each corresponding to one byte and having a capacity to store the possibly longest data frame.

A CRC check circuit 78 is connected to the shifter input and output circuit 82 and detects errors of the DA, SA, C, DATA and CRC fields in the data frame received in the receiving shifter 81 as sequentially reading out these fields. The output of the CRC check circuit 87 is effective, when the data frame is to be received by this station, to cancel the data frame written in the receiving buffer 86, if an error has been detected.

The receiving shifter 81 receives the LA field next to the CRC field. The LA field is replaced by the output of an LA preparation circuit 88 before being outputted therefrom. That is, when the flag $F_2$ next to the LA field is received in the left one byte location of the receiving shifter 81, a new LA field is supplied from the LA preparation circuit 88 through the shifter input and output circuit 82 to be set to the right one byte location thereof. The LA preparation circuit 88 generates a pattern of $(24)_{16}$ as shown in Item 2 in FIG. 3 when the receiving buffer 86 is fully occupied because of the delay in the internal processing and the DA, SA, C, DATA and LA fields cannot be written in this buffer. The LA preparation circuit 88 generates a pattern of $(12)_{16}$, as shown in Item 1 in FIG. 3, when the result of the check in the error check circuit 87 shows the presence of an error, and generates a pattern of $(48)_{16}$, as shown in Item 3, when the frame has been received correctly. When the flag $F_2$ is detected by the shifter control circuit 83, the station terminates the receiving of one frame.

On the other hand, the received data written in the receiving buffer 86 is written into the memory 42 in FIG. 4. That is, the received data read out of the receiving buffer 86 in FIG. 4 is written in the memory 42 through the OR gate 41. The write address is prepared as follows. The memory 42 is provided with a plurality of receiving areas for storing the data received from the loop transmission path. The respective heading addresses for these areas are set into a register (not shown) and given to the address register 43 in the same manner as described hereinbefore with respect to the register 44 to be used as the write addresses.

Each time the received data is written in one of the receiving areas of the memory 42, the heading address of the area is stored in a register (not shown) similar to the register 49. When the address data is stored in this register, the address data from this register is applied to the address register 43 in the same manner as the address data from the register 49. This address data is used as the read address for reading out the data from the addressed area of the memory 42. In this case, the fields other than the DATA field are removed by the data fetch circuit 38 so that only the DATA field is transmitted to a data output unit (not shown).

The operation of the station working as S-ST will be explained again below. Referring to FIG. 5, the S-ST receives a data frame from the loop transmission path 1 in the same manner of operation as R-ST. It is decided that this data frame has been sent out from this station, when only the field of the SA comparator circuit 85 coincides with its own SA field. In this case, the shifter control circuit 83 controls the shifter input and output circuit 82 to fetch the C field and the LA field before the flag $F_2$ subsequently received by the register 81. Then, the DA, SA, C and DATA fields in the data frame sent out from the station are written into the receiving buffer 86. All of this data is hereinafter, in whole, referred to as response management data. It should be noted, however, that the LA field is the one rewritten by the R-ST.

Referring to FIG. 4, the response management data written in the receiving buffer 86 is stored in the memory 42 through the OR gate 41. In this case, the writing address is given by the address register 43. The address data thereof are prepared in the following manner.

The memory 42 is provided with a plurality of response management areas in which the response management data from the loop transmission path are to be written. Each of the response management areas has a 4-byte capacity and the address data $B_0, B_1, \ldots$ and $B_m$ indicating the heading addresses of the areas are set into a register 52. The register 52 is of the same type as that of the register 44 or 49. The output of the register 52 is set into a register 54 through an OR gate 53. The content of the register 54 is given to the address register 43 through the OR gate 47. The content of the register 54 is incremented by "1" by the adder 55 each time one-byte data is written into the memory 42. In this manner, the write address for the response management data is prepared.

Upon termination of the writing into the response management area designated by the address data given from the register 52, this address data is inputted into a register 56. The register 56 is of the same type as that of the register 44 or 49. Accordingly, each time the response management data read out from the loop transmission path is written into the addressed response management area of the memory 42, the heading address of the area is stored in the register 56.

When any address data is inputted in the register 56, the address data stored in the left end location thereof is set into the address register 43 through the OR gate 53, the register 54 and the OR gate 47, so that the four bytes of data are read out of the memory 42. In this case, the content of the register 54 is incremented by "1" by the adder 55 each time one byte is read out. Thus, the response management data is read out of the memory 42. Of this data, the LA field is set into a register 57 and the remaining DA, SA and C fields are set into a register 58. The content of the register 57 is applied to an LA decision circuit 59 for checking the content of the response shown by the LA field. If the result of the LA decision circuit 59 does not show normal receiving, a resending control circuit 60 decides that the data frame having the response management data just checked has not been received by the intended R-ST. In this case, the contents of the register 51 are shifted to the left by one bit space, and at the same time, the address data so far positioned at the left end is applied to the register 49 through the OR gate 48. Thus, the data within the sending area which is shown by this address data is sent again to the loop transmission path. The contents of the register 56 are shifted to the left by one bit space, and at the same time, the address data so far positioned at the left end is inputted to the register 52, so that the response management area designated by this address data is set as a write-permitting area. Then, the same operation is repeated with respect to the address data which has been set to the left end location of the register 56.

If the result of the LA decision circuit 59 indicates a normal receiving, the resending control circuit 60 decides that the data frame having the checked response management data has been received by the intended R-ST. In this case, the address data positioned at the left end of the register 51 is applied to the address register 43 through the OR gate 53, the register 54 and the OR gate 47, so that three-byte data is read out of the memory 42. The content of the register 54 is incremented by "1" by the adder 55 each time one byte is read out.

In this case, the DA, SA and C fields in the data frame addressed by the register 43 are read out of the memory 42 and then they are set into a register 61. The contents of the registers 58 and 61 are compared by a comparator circuit 62. If the comparison by the comparator circuit 62 indicates that the contents do not match each other, the resending control circuit 60 decides that the data frame which was actually sent out from this station has not been normally transmitted through the loop transmission path and hence has not been received by the intended R-ST. In this case, the address data at the left end of the register 51 is inputted to the register 49 through the OR gate 48 for again sending out the data within the area designated by this address data. The address data newly set to the left end position of the register 51 is applied to the address register 43 through the OR gate 53, the register 54 and the OR gate 47, and the same operation as described above is repeated until the coincidence of the contents is obtained by the comparator circuit 62.

If the comparison by the comparator circuit 52 indicates no coincidence with respect to all the address data within the register 51, all the sending data so far sent out is sent out again. In this case, it is decided that there is an error in the response management data that has been subjected to the first comparison check and the address data so far positioned at the left end of the register 56 is applied to the register 52. The response management area shown by this address data is set as a write-permitting area. Then, the same operation as described above is repeated with respect to the address data newly set to the left end position of the register 56.

If the result of comparison by the comparator circuit 62 indicates that the contents coincide, the resending control circuit 60 decides that the corresponding data frame has been normally transmitted through the loop transmission path and has been received by the intended R-ST. In this case, the address data at the left end of the register 51 is inputted to the register 44, and the sending area shown by this address data is set as a write-permitting area. In order to check whether the response management data read out by the address data at the left end position of the register 56 corresponds to the data frame which has been sent out last, the address data of the register 50 is set into the address register 43 through the OR gate 53, the register 54 and the OR gate 47, and three bytes are read out of the memory 42 in the same manner as described above. The three-byte data read out of the memory 42 are the DA, SA and C fields of the data frame that have been sent out last, and they are set into a register 61. The contents of the registers 58 and 64 are compared by a comparator circuit 65.

Numeral 63 designates a timer which is started each time the address data from the register 49 is supplied to the register 51 produces an output signal after a predetermined period of time. The timer 63, therefore, shows a time count value based on the starting point when the last sending data is read out of the memory 42. If the result of comparison by the comparator circuit 65 indicates that the contents do not coincide, it is decided that the response management data read out by the address data at the left end position of the register 56 does not correspond to the data frame which has been sent out last, and the timer 63 is not reset in this case. However, if the result of comparison by the comparator circuit 65 indicates that the contents coincide, it is decided that the response management data read out by the address data at the left end position of the register 56 corresponds to the data frame that has been sent out last, and the timer 63 is reset in this case. Then, the address data positioned at the left end of the register 56 is inputted to the register 52 and the response management area shown by this address data is set as a write-permitting area.

The same operation as described above is repeated with respect to the address data newly set to the left end position of the register 56. If the comparison by the comparator circuit 65 indicates no coincidence with respect to all the address data in the register 56, the timer 63 continues to count time without being reset until it produces the output signal. At this time, at least one address data is retained in the register 51 and the sending data stored in the sending area addressed by the retained address data is not yet subjected to the check of the response management data by any of the LA decision circuit 59 and the comparator circuit 62 as abovementioned. Then, it is decided that this sending data has not been received by intended R-ST's and the address data retained in the register 51 is inputted through the OR gate 48 to the register 49 for again sending out the sending data stored in the sending areas addressed by the this address data. Then, the resending control circuit 60 decides that the data frame sent out last has been received by the predetermined R-ST. In this case, the address data at the left end position of the register 51 is inputted to the register 49 through the OR gate 48 for again sending out the data within the area shown by this address data.

As described above, according to this invention, it is possible to confirm the response of a transmission frame within the time period while the frame is transmitted by one circulation through the loop, thereby minimizing the time for the sending data buffer at the S-ST side to hold the data until resending it. Accordingly, it is possible to minimize the capacity of data buffer for newly generated data and hence reduce the capacity of the buffer. Further, the R-ST side is not required to generate a response frame and the S-ST side can receive the response frames in the same order as that in sending of the frames, so that the processings at both the R-ST and the S-ST can be simplified.

We claim:

1. A data transmission system comprising a loop transmission path for transmitting signals representing a frame of data and a plurality of data stations connected to the transmission path and having respective addresses within the system, each of said stations comprising:
    means for generating signals representing a frame of data including a data portion, an answer information portion, a sending-station address portion and a receiving-station address portion;
    means for sending out said signals representing the frame of data produced by said generating means to said loop transmission path with said data portion being positioned in advance of said answer portion;
    means for receiving signals representing a frame of data transmitted on said loop transmission path and for retransmitting the received signals representing the entire frame of data on said loop transmission path;
    means for comparing the address of the station with the receiving-station address portion of the received frame of data received in the form of said signals on said loop transmission path to determine whether the frame of data is destined for said station;
    means responsive to said comparing means for storing said signals representing at least the data portion of said received frame of data when the receiving-station address portion of said received frame of data coincides with the address of the receiving-station;
    checking means connected to said receiving and retransmitting means for checking at least the data portion of said frame of data represented by said received signals to detect abnormalities therein; and
    first means coupled to said checking means for altering said received signals prior to retransmission by setting the answer information portion of the received frame of data to one of a plurality of selected code patterns depending on whether or not said received frame of data has been normally received in said storage.

2. A data transmission system according to claim 1, wherein said storing means includes memory means for storing the received signals representing a frame of data.

3. A data transmission system according to claim 1, wherein each station further comprises timer means responsive to said sending means for producing a timing signal a predetermined time after said sending means sends out on said loop transmission line signals representing a frame of data produced by said generating means in the station, said sending means including means responsive to said timing signal for re-sending said generated signals representing a frame of data out on said loop transmission line in response to said timing signal, and said detecting means including means for comparing the address of the station with the sending-address portion of a frame of data transmitted as signals on said loop transmission line and for resetting said timer means when coincidence is detected between the station address and the sending-address portion of a received frame of data.

4. A data transmission system according to claim 1, wherein the frame of data produced by said generating means includes a sequence number portion indicating the position of the frame of data in a plurality of frames of data produced by said generating means and sent out on said loop transmission line by said sending means.

5. A method of transmitting signals representing a frame of data on a loop transmission path between a plurality of data stations connected to the transmission path, the steps comprising:
    generating signals representing a frame of data including a data portion, an answer information portion, a sending-station address portion and a receiving-station address portion in a first station;
    sending out said signals representing the frame of data generated in said first station to said loop transmission path from said first station;
    receiving in a second one of said stations signals representing a frame of data transmitted on said loop transmission path and immediately retransmitting the received signals representing the entire frame of data on said loop transmission path;
    comparing in said second station the address of the station with the receiving-station address portion of the frame of data received on said loop transmission path in the form of said signals to determine whether the frame of data is to be received by said second station;

storing in said second station the signals representing said frame of data received on said loop transmission path when said comparing step indicates that the frame of data is to be received by said second station;

checking at least the data portion of said frame of data represented by said received signals to detect abnormalities therein; and altering said received signals prior to retransmission by setting the answer information portion of the received frame of data to a selected code pattern indicating whether or not said received frame of data has been normally received in said second station in response to the result of said checking step.

6. A method according to claim 5, wherein said altering step comprises changing the answer information portion of the received signals to one of at least three code patterns representing receipt of a correct data frame, receipt of an erroneous data frame and inability of the second station to process the received signals.

* * * * *